United States Patent [19]

Inata et al.

[11] 4,256,558

[45] Mar. 17, 1981

[54] CURED OR UNCURED LINEAR AROMATIC POLYESTER COMPOSITION AND PROCESS FOR PREPARATION THEREOF

[75] Inventors: Hiroo Inata; Tamio Arakawa; Toshio Nishihara, all of Hino, Japan

[73] Assignee: Teijin Limited, Osaka, Japan

[21] Appl. No.: 840,301

[22] Filed: Oct. 7, 1977

[30] Foreign Application Priority Data

Oct. 12, 1976 [JP] Japan .............................. 51/121322
Mar. 17, 1977 [JP] Japan .............................. 52/028026
Mar. 23, 1977 [JP] Japan .............................. 52/031121

[51] Int. Cl.$^3$ .......................... B29B 3/02; C08F 8/00
[52] U.S. Cl. ...................... 204/159.15; 204/159.19; 264/22; 525/10; 525/418
[58] Field of Search ................... 260/873, 861, 867; 204/159.19, 159.15; 264/22; 525/10, 445, 418

[56] References Cited

U.S. PATENT DOCUMENTS

| | | | |
|---|---|---|---|
| 3,243,211 | 3/1966 | Wetmore | 264/230 |
| 3,839,171 | 10/1974 | Akamatsu et al. | 204/159.19 |
| 3,968,015 | 7/1976 | Nyberg | 204/159.19 |
| 4,073,830 | 2/1978 | Nyberg | 525/10 |
| 4,097,350 | 6/1978 | Pastor et al. | 427/54 |

*Primary Examiner*—J. Ziegler

*Attorney, Agent, or Firm*—Sherman & Shalloway

[57] ABSTRACT

A cured or uncured linear aromatic polyester composition consisting essentially of:

(A) 100 parts by weight of a saturated linear aromatic polyester in which at least 70 mole % of the acid component consists of an aromatic dicarboxylic acid, and (B) 0.1 to 50 parts by weight of a polyallyl compound which contains not less than 2 allyl or substituted allyl groups in the molecule, does not decompose under conditions of melt-blending with the polyester (A), and is non-reactive with the polyester (A) under conditions of melt-blending with the polyester (A), the allyl or substituted allyl groups being expressed by the following formula

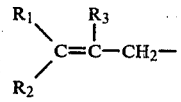

wherein $R_1$, $R_2$ and $R_3$ are identical to or different from each other and represent a member selected from the group consisting of a hydrogen atom and organic groups.

11 Claims, No Drawings

CURED OR UNCURED LINEAR AROMATIC POLYESTER COMPOSITION AND PROCESS FOR PREPARATION THEREOF

This invention relates to a cured or uncured linear aromatic polyester composition composed of a saturated aromatic linear polyester and a polyallyl compound which contains not less than 2 allyl or substituted allyl groups in the molecule, does not decompose under conditions of melt-blending with the polyester, and is non-reactive with the polyester. The composition has various improved properties such as superior mechanical properties, thermal stability, light stability, chemical resistance and dimensional stability. The invention also relates to a process for preparing the composition.

Saturated aromatic linear polyesters such as polyethylene terephthalate and polybutylene terephthalate are very useful plastic materials for producing shaped articles such as films and filaments. These polymers, however, do not have entirely satisfactory thermal stability and light stability. For example, when exposed to high temperatures or to light in the air, they tend to decrease in the degree of polymerization and consequently decrease in mechanical strength. Their chemical resistance is also unsatisfactory, and they have only limited uses in fields which require sufficient chemical resistance, for example as filters or filter supports. These polyesters neither have a sufficiently high Young's modulus, and are limited in uses which require a high Young's modulus.

Numerous attempts have been made in the past to improve the thermal stability and other properties of these polyesters by incorporating various additives, but all of them have encountered great difficulties in imparting satisfactory thermal stability and other properties without sacrificing the other desirable properties inherently possessed by the polyesters. Usually, an attempt to improve one property resulted in a nonnegligible deterioration in another.

The present inventors worked extensively in order to solve the above technical problem associated with saturated aromatic linear polyesters, and to provide a saturated aromatic linear polyester composition which has improved properties such as superior mechanical properties, thermal stability, light stability, chemical resistance and dimensional stability. The work led to the discovery that the aforesaid improvement can be achieved by incorporating into the saturated aromatic linear polyester a minor amount of a polyallyl compound which contains not less than 2 allyl or substituted allyl groups, does not decompose under conditions of melt-blending with the polyester and is non-reactive with the polyester, and which has not been suggested at all as an additive for improving the properties of saturated aromatic linear polyesters.

Accordingly, it is an object of this invention to provide a cured or uncured linear aromatic polyester composition having the aforesaid improved properties.

Another object of this invention is to provide a process for producing the aforesaid composition especially in the form of films, filaments and other shaped articles.

The above and other objects and advantages of this invention will become more apparent from the following description.

The cured or uncured linear aromatic polyester composition of this invention consists essentially of:

(A) 100 parts by weight of a saturated linear aromatic polyester in which at least 70 mol% of the acid component consists of an aromatic dicarboxylic acid, and (B) 0.1 to 50 parts by weight of a polyallyl compound which contains not less than 2 allyl or substituted allyl groups in the molecule, does not decompose under conditions of melt-blending with the polyester (A), and is non-reactive with the polyester (A), the allyl or substituted allyl groups being expressed by the following formula

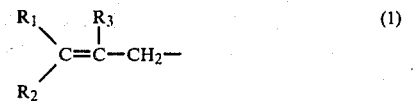

wherein $R_1$, $R_2$ and $R_3$ are identical to or different from each other and represent a member selected from the group consisting of a hydrogen atom and organic groups.

The saturated aromatic linear polyester (A) in the polyester composition of this invention is derived from an acid component at least 70 mole%, preferably at least 80 mole%, of which consists of an aromatic dicarboxylic acid or its functional derivative, and a glycol. Examples of the acid component are terephthalic acid, isophthalic acid, naphthalenedicarboxylic acid, diphenyldicarboxylic acid, diphenylsulfonedicarboxylic acid, diphenoxyethanedicarboxylic acid, diphenyletherdicarboxylic acid, methylterephthalic acid, and methylisophthalic acid. Of these, terephthalic acid is most preferred.

Other carboxylic acids may be used in an amount of not more than 30 mole%, preferably not more than 20 mole%, together with the aromatic dicarboxylic acid as the acid component. Examples of such carboxylic acids are aliphatic dicarboxylic acids such as succinic acid, adipic acid or sebacic acid, alicyclic dicarboxylic acids such as hexahydroterephthalic acid, and hydroxycarboxylic acids such as ε-hydroxycaproic acid, hydroxybenzoic acid and hydroxyethoxybenzoic acid.

Examples of the glycol component of the polyester (A) include ethylene glycol, trimethylene glycol, tetramethylene glycol, neopentylene glycol, hexamethylene glycol, decamethylene glycol, cyclohexane dimethylol, 2,2-bis(β-hydroxyethoxyphenyl) propane, hydroquinone, and 2,2-bis(hydroxyphenyl) propane. Of these, ethylene glycol and tetramethylene glycol are especially preferred.

The polyester (A) has an intrinsic viscosity [η], measured at 35° C. in o-chlorophenol, of at least 0.4, preferably at least 0.5.

The organic groups represented by $R_1$, $R_2$ and $R_3$ in formula (1) representing the polyallyl compound (B) are preferably selected from the group consisting of alkyl groups containing 1 to 6 carbon atoms, especially 1 to 3 carbon atoms, halogen atoms, and a phenyl group optionally having a lower ($C_1$–$C_3$) alkyl group as a substituent. Especially preferred groups of formula (1) are allyl, methallyl and crotyl groups.

It is important that the polyallyl compound (B) should contain not less than 2 allyl or substituted allyl groups of formula (1) in the molecule, should not decompose under conditions of melt-blending with the polyester (A), and should be non-reactive with the polyester under conditions of melt-blending with the polyester (A). It can be chosen from a wide range of readily available compounds. The availability of the allyl compound (B) from such a wide range of species is another advantage of the present invention.

Examples of suitable polyallyl compounds are those of formulae (I), (II) and (III).

(I) Compunds of the formula

wherein A represents an allyl group or a substituted allyl group of formula (1); X is a member selected from the group consisting of —CONR$_4$—* in which R$_4$ represents a hydrogen atom or an alkyl group containing 1 to 4 carbon atoms,

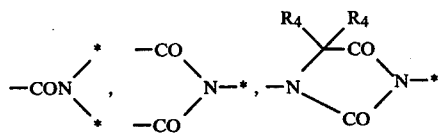

in which R$_4$ is as defined above and the two R$_4$ groups may be the same or different, and —O—*, the symbol * in the above formulae showing that A is bonded; Q$_1$ represents a group selected from the class consisting of monovalent to tetravalent aliphatic groups containing 2 to 20 carbon atoms, monovalent to tetravalent alicyclic groups containing 4 to 12 carbon atoms, monovalent to tetravalent groups of the formula

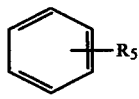

in which R$_5$ represents a hydrogen atom, an aryl group containing 6 to 12 carbon atoms, an alkyl group containing 1 to 6 carbon atoms, an alkyloxy group containing 1 to 6 carbon atoms, a nitro group or a halogen atom, monovalent to tetravalent groups of the formula

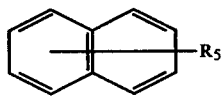

in which R$_5$ is as defined above, and monovalent to tetravalent groups of the formula

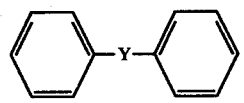

in which Y is a member selected from the class consisting of —O—, —CO—, —SO$_2$, —NR$_4$— in which R$_4$ is as defined above, —O(CH$_2$CH$_2$)$_l$O— in which l is an integer of 1 to 3, and alkylene groups containing 2 to 12 carbon atoms; when X is —O—*, Q$_1$ represents an aliphatic group or an alicyclic group; and m and n are each integers of 1 to 4 and m×n≧2.

Preferred aliphatic groups are alkylene groups containing 2 to 20 carbon atoms, and

and preferred alicyclic groups are monovalent to tetravalent groups

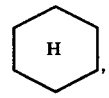

and monovalent to tetravalent groups

Specific examples of the compounds of formula (I) are:

N,N'-diallyl(or dimethallyl or dicrotyl) adipamide,
N,N'-diallyl(or dimethallyl or dicrotyl) sebacamide,
N,N'-diallyl(or dimethallyl or dicrotyl) decanedicarboxamide,
N,N'-diallyl(or dimethallyl or dicrotyl) terephthalamide,
N,N'-diallyl(or dimethallyl or dicrotyl) isophthalamide,
N,N'-diallyl(or dimethallyl or dicrotyl) naphthalenedicarboxamide,
N,N-diallyl(or dimethallyl or dicrotyl) hexahydroterephthalamide,
N,N-diallyl(or dimethallyl or dicrotyl) diphenoxyethanedicarboxyamide,
N,N,N''-triallyl(or trimethallyl or tricrotyl) trimesamide,
N,N,N',N'-tetraallyl(or tetramethallyl or tetracrotyl) adipamide,
N,N,N',N'-tetraallyl(or tetramethallyl or tetracrotyl) sebacamide,
N,N,N',N'-tetraallyl(or tetramethallyl or tetracrotyl) decanedicarboxamide,
N,N,N',N'-tetraallyl(or tetramethallyl or tetracrotyl) terephthalamide,
N,N,N',N'-tetraallyl(or tetramethallyl or tetracrotyl) isophthalamide,
N,N,N',N'-tetraallyl(or tetramethallyl or tetracrotyl) naphthalenedicarboxamide,
N,N-diallyl(or dimethallyl or dicrotyl) benzamide,
N,N,N',N'-tetraallyl(or tetramethallyl or tetracrotyl) hexahydroterephthalamide,
N,N,N',N'-tetraallyl(or tetramethallyl or tetracrotyl) diphenoxyethanedicarboxamide,
N,N,N',N',N'',N''-hexaallyl(or hexamethallyl or hexacrotyl) trimesamide,
N,N,N',N',N'',N''-hexaallyl(or hexamethallyl or hexacrotyl) trimellitamide,
N,N,N',N',N'',N'',N''',N'''-octaallyl(or octamethallyl or octacrotyl) pyromellitamide,
N,N'-diallyl(or dimethallyl or dicrotyl) pyromellitimide
N,N'-diallyl(or dimethallyl or dicrotyl) benzophenone-3,4,3',4'-tetracarboxybisimide.
N,N'-diallyl(or dimethallyl or dicrotyl) butane-1,2,3,4-tetracarboxybisimide.
N,N'-diallyl(or dimethallyl or dicrotyl) cyclopentane-1,2,3,4-tetracarboxybisimide.

ethylenebis(N-allyl(or N-methallyl or N-crotyl) trimellitimide)amide,
tetramethylenebis(N-allyl(or N-methallyl or N-crotyl) trimellitimide)amide,
hexamethylenebis(N-allyl(or N-methallyl or N-crotyl) trimellitimide)amide,
decamethylenebis(N-allyl(or N-methallyl or N-crotyl) trimellitimide)amide,
dodecamethylenebis(N-allyl(or N-methallyl or N-crotyl) trimellitimide)amide,

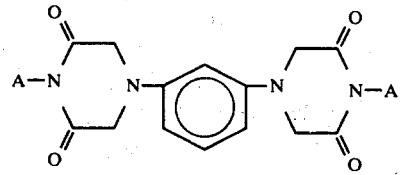

(A = allyl, methallyl or crotyl)

N,N'-diallyl(or dimethallyl or dicrotyl)trimellitamideimide,
N,N,N'-triallyl(or trimethallyl or tricrotyl)trimellitamideimide, and
tetrakisallyl(or methallyl or crotyl)oxymethylmethane.

(II) Compounds of the following formula

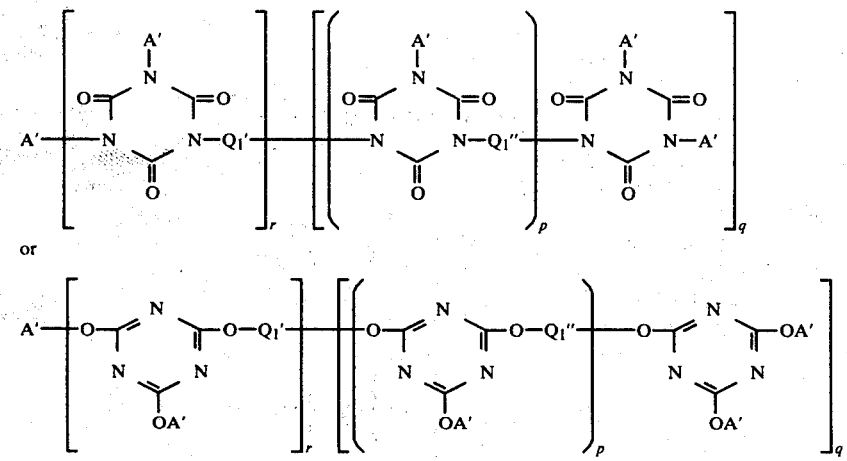

wherein two or more A' groups may be the same or different, and at least two of them are groups A as defined above, and the rest are groups A or monovalent groups represented by $Q_1$ in formula (I); $Q'_1$ are divalent to tetravalent groups of $Q_1$ in formula (I); $Q''_1$ represents divalent groups of $Q_1$ in formula (I); r is 0 or 1; p is 0 or an integer of up to 10; and q is an integer of 1 to 3.

Specific examples of the compounds of formula (II) are as follows:
Triallyl (or tricrotyl or trimethallyl) isocyanurate,
diallyl (or dicrotyl or dimethallyl) methyl isocyanurate,
diallyl (or dicrotyl or dimethallyl) ethyl isocyanurate,
diallyl (or dicrotyl or dimethallyl) decyl isocyanurate,
diallyl (or dicrotyl or dimethallyl) dodecyl isocyanurate,
diallyl (or dicrotyl or dimethallyl) stearyl isocyanurate,
diallyl (or dicrotyl or dimethallyl) lauryl isocyanurate,
diallyl (or dicrotyl or dimethallyl) myristyl isocyanurate,
diallyl (or dicrotyl or dimethallyl) cetyl isocyanurate,
ethylenebis[diallyl (or dicrotyl or dimethallyl) isocyanurate],
tetramethylenebis[diallyl(or dicrotyl or dimethyallyl) isocyanurate],
hexamethylenebis[diallyl(or dicrotyl or dimethallyl) isocyanurate],
decamethylenebis[diallyl(or dicrotyl or dimethallyl) isocyanurate],
polyethylene allyl (or methallyl or crotyl) isocyanurate terminated with a diallyl isocyanurate residue,
polytetramethylene allyl (or methallyl or crotyl) isocyanurate terminated with a diallyl isocyanurate residue, polyhexamethylene allyl (or methallyl or crotyl) isocyanurate,
polydecamethylene allyl (or methallyl or crotyl) isocyanurate,
triallyl (or trimethallyl or tricrotyl) cyanurate,
diallyl (or dimethallyl or dicrotyl) methyl cyanurate,
diallyl (or dimethallyl or dicrotyl) ethyl cyanurate,
diallyl (or dimethallyl or dicrotyl) decyl cyanurate,
diallyl (or dimethallyl or dicrotyl) dodecyl cyanurate,
diallyl (or dimethallyl or dicrotyl) stearyl cyanurate,
diallyl (or dimethallyl or dicrotyl) lauryl cyanurate,
diallyl (or dimethallyl or dicrotyl) myristyl cyanurate,
diallyl (or dimethallyl or dicrotyl) cetyl cyanurate,
tetramethylenebis[diallyl (or dimethallyl or dicrotyl) cyanurate],
hexamethylenebis[diallyl (or dimethallyl or dicrotyl) cyanurate],
decamethylenebis[diallyl (or dimethallyl or dicrotyl) cyanurate],
polytetramethylene allyl (or methallyl or crotyl) cyanurate terminated with a diallyl cyanurate residue,
polyhexamethylene allyl (or methallyl or crotyl) cyanurate terminated with a diallyl cyanurate residue, and
polydecamethylene allyl (or methallyl or crotyl) cyanurate terminated with a diallyl cyanurate residue.

These compounds of formula (II) can be easily synthesized by the method disclosed in Zh. Organ. Khim., 2 (10), pp. 1742–3 (1965), or J. Am. Chem. Soc., 73, p. 2999–3004 (1951).

(III) Compounds having recurring units of the following formula

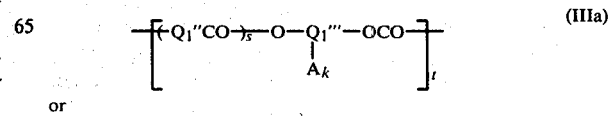

(IIIa)

or

-continued

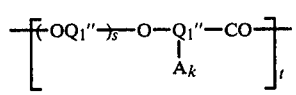 (IIIb)

wherein A and Q″₁ are as defined above, Q‴₁ represents a group having a valence of 3 to (k+2) and expressed by

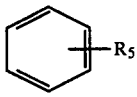

in which R₅ is as defined hereinabove, a group having a valence of 3 to (k+2) and expressed by

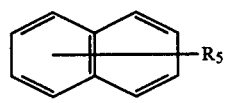

or a group having a valence of 3 to (k+2) and expressed by

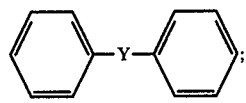

k is an integer of 1 to 4; s is 0 or 1; and t is an integer greater than 1, preferably 1 to 20, and k×t≧2.

The compounds of formula (IIIa) can be obtained by reacting Q″₁(COOH)₂ or its ester-forming derivatives (e.g., its C₁₋₃ alkyl esters, C₆₋₁₂ aryl ester or acid halides) (in the case of s=1), or COCl₂, COBr₂, or diaryl carbonates (in the case of S=0) with

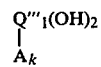

or its ester-forming derivatives (e.g., its lower fatty acid esters, or alkali metal salts). The compounds of formula (IIIb) can be obtained by reacting

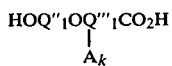

or its ester forming derivatives (in the case of s=1) or

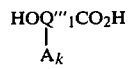

or its ester-forming derivatives (in the case of s=0) in a known manner. The ends of these compounds become the ends of the ingredients constituting these compounds, and preferably the ends are converted to the form of alkyl or aryl esters in a customary manner.

Examples of the compounds of formula (III) are those containing the following recurring units.

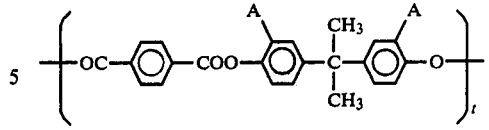

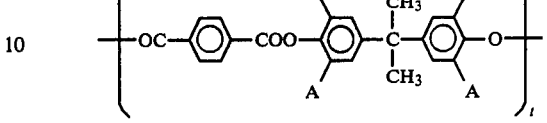

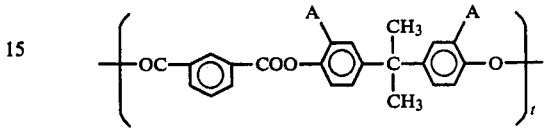

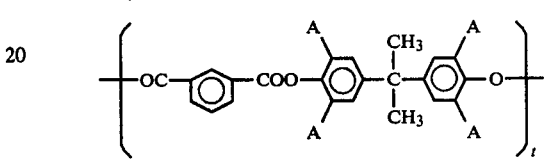

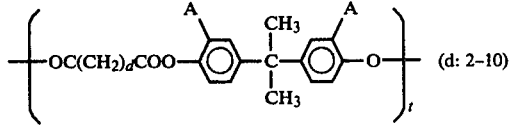 (d: 2-10)

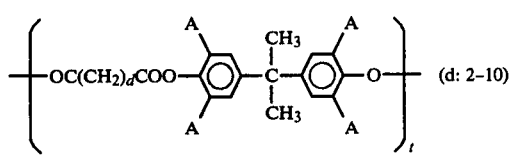 (d: 2-10)

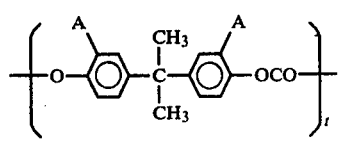

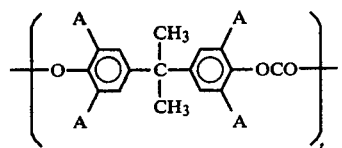

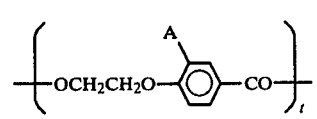

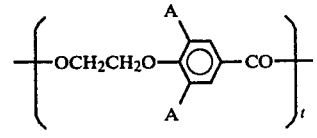

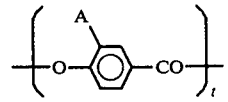

A = allyl, methallyl, or crotyl)

Of the compounds of formulae (I), (II) and (III), those of formulae (I) and (II) are preferred, and compounds of formula (II) are most preferred.

The polyallyl compound (B) is non-reactive with the polyester (A) under melt-blending conditions, and when mixed with the polyester for 15 minutes in an inert gas at a temperature at which the polyester is melted (temperatures from the melting point of the polyester to a point 20° C. above it), does not substantially react with the polyester nor decompose. In other words, the polyallyl compound (B) does not generate an insoluble matter which is insoluble in o-chlorophenol at 35° C., and its intrinsic viscosity does not decrease by 0.2 or more upon being placed under the melt-blending conditions. Accordingly, polyallyl compounds containing highly reactive ester-forming functional groups such as highly reactive ester, hydroxyl or carboxyl groups, and polyallyl compounds which decompose at the melting temperature of the polyester (A) are unsuitable for use in the present invention. Polyallyl compounds containing ester-forming functional groups having low reactivity [e.g., the compounds of formula (III)] can be used in the invention.

The cured or uncured linear aromatic polyester composition of this invention contains 100 parts by weight of the saturated aromatic linear polyester (A) and 0.1 to 50 parts by weight of the polyallyl compound (B). Preferably, the amount of the polyallyl compound (B) is 0.5 to 40 parts by weight, more preferably 0.5 to 20 parts, especially 1.0 to 20 parts by weight, per 100 parts by weight of the polyester.

The composition of this invention can be obtained by mixing the polyester (A) and the polyallyl compound (B) by any desired mixing means capable of affording uniform mixtures. Mixing is performed by using a mechanical mixing means such as an S-type blender or V-type blender, and then using a kneader of an extruding machine at a temperature at which the polyester (A) becomes molten or higher, preferably from the melting point of the polyester (A) to a point about 60° C. higher than the melting point. The mixing of the polyester and the polyallyl compound can also be performed by allowing the polyallyl compound (B) to be present during the reaction of forming the polyester (A). In this embodiment, it is preferred to add the polyallyl compound in the latter stage of the reaction, especially when the intrinsic viscosity of the polyester has reached at least 0.4.

The composition of this invention may contain various additives. Examples of these additives are ultraviolet absorbers such as benzotriazole compounds, phenol salicylate compounds, benzophenone compounds and acrylonitrile compounds; specific examples being

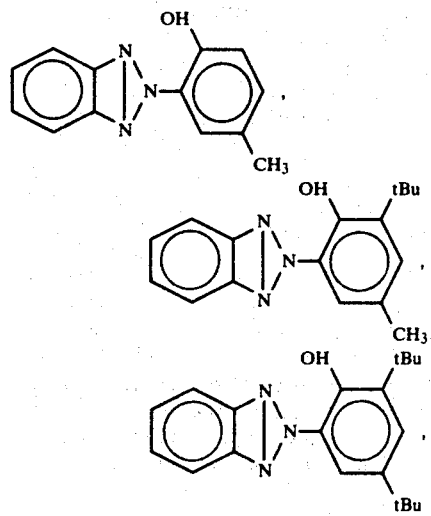

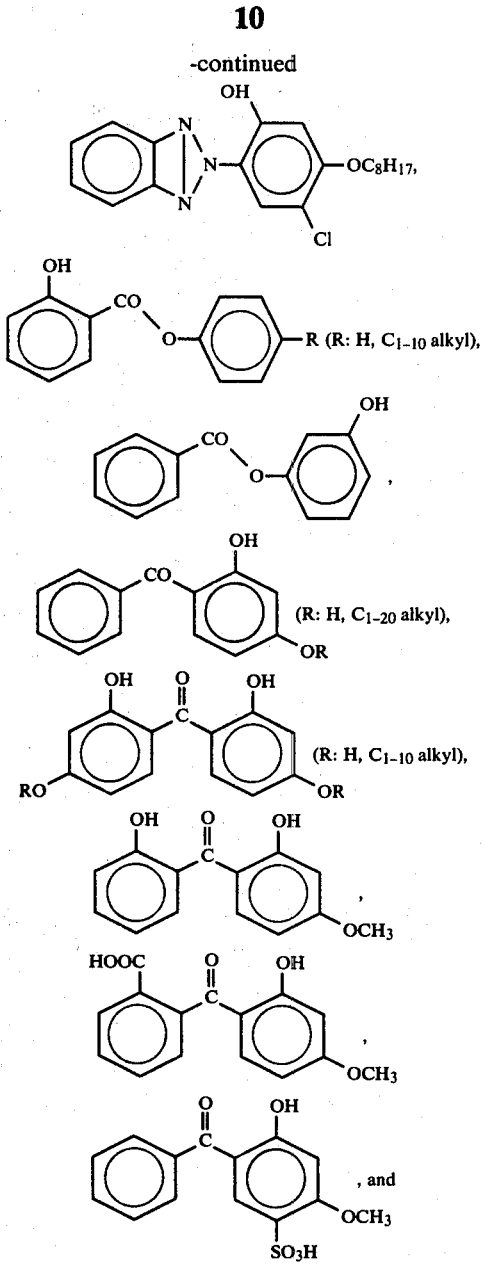

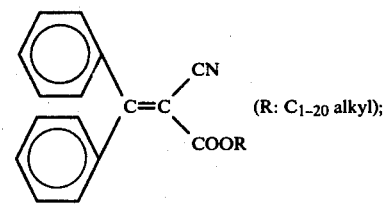

oxidation or heat stabilizers of the hindered phenol, phosphorus compound and sulfur compound types such as

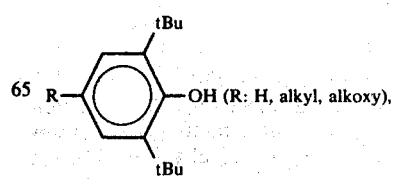

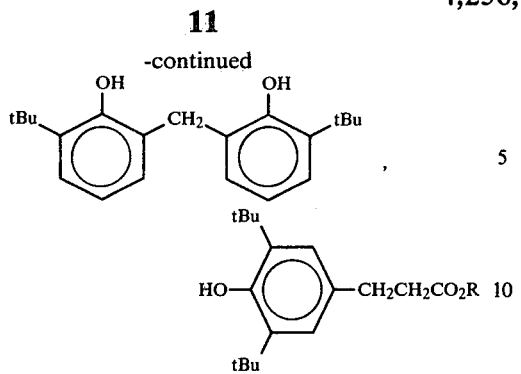

(R: $C_{1-20}$ alkyl), $RO_2CCH_2CH_2SCH_2CH_2CO_2R$ (R: $C_{1-20}$ alkyl), phosphoric acid, phosphorous acid, phosphonic acid, phosphonous acid, phosphinic acid, phosphinous acid, phosphine oxide, phosphine, and alkyl or aryl esters of these; coloring agents such as titanium oxide, carbon black, 1,5-dihydroxy-4,8-diaminoanthraquinone, 1,5-dihydroxy-4,8-diamino-2-phenylanthraquinone, 1-amino-2-cyano-4-methylaminoanthraquinone, 1-methyl-amino-4-toluidinoanthraquinone, 1,4-bisbenzylaminoanthraquinone, 1,4-diethylaminoanthraquinone, 1,4-dihexylaminoanthraquinone, 1-(2',6'-dimethylanilino)-4,5,8-trihydroxyanthraquinone, 1-(2',4',6'-trimethylanilino)-4,5,8-trihydroxyanthraquinone, 1-(2',6'-diethylanilino)-4,5,8-trihydroxyanthraquinone, and 1-(2'-methyl-6'-ethylanilino)-5,8-trihydroxyanthraquinone; fluorescent bleaching agents such as those available under the trademarks Blankophor (BASF), Unitex (Ciba), Tinopal (Geigy Chemical), Leucophor (Sandoz), Kaycoll (Nippon Soda), Kayahor (Nippon Kayaku), and Whitex (Sumitomo Chemical); photo-reaction initiators such as those of the general formula $[R_6—Z'-R_7)_a]_b(Z)_c$ (to be described hereinbelow); inorganic and organic fire retardants, for example antimony compounds such as antimony trioxide, phosphorus compounds cited as those exemplified above as heat stabilizers, and halogen compounds such as hexabromobenzene, decabromobiphenyl, decabromobiphenyl ether, polycarbonates of tetrabromobisphenol A (degree of polymerization 2-30) and octabromobiphenyl; and nucleating agents, lubricants or fillers such as silica, calcium carbonate, aluminum silicate, calcium phosphate, alumina, barium sulfate, magnesium sulfate (talc) diatomaceous earth, glass fibers, and carbon fibers.

Preferred photo-reaction initiators are those of the general formula $[R_6—Z'-R_7)_a]_b(Z)_c$ given hereinabove wherein at least one of $R_6$ and $R_7$ is an aromatic group, and the other is an aromatic group with 6 to 12 carbon atoms, an aliphatic group with 1 to 10 carbon atoms or an alicyclic group with 5 to 12 carbon atoms, $R_6$ and $R_7$ may be identical to or different from each other, and $R_6$ and $R_7$ may be bonded to each other either directly or through a group selected from the class consisting of —O—, —S—, —SO₂— and —CO—; Z' is a group represented by

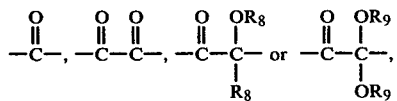

in which $R_8$ is a hydrogen atom, an alkyl group with 1 to 10 carbon atoms, an aryl group with 6 to 12 carbon atoms or a cycloalkyl group with 5 to 10 carbon atoms with the two $R_8$ groups being identical to or different from each other, $R_9$ is an alkyl group with 1 to 10 carbon atoms or a cycloalkyl group with 5 to 10 carbon atoms with the two $R_9$ groups being identical to or different from each other, the two $R_8$ groups or $R_9$ groups each may be bonded to each other, or one of the two $R_8$ or $R_9$ groups may be bonded to $R_6$ or $R_7$, respectively, and Z is a group bonded to $R_7$, and represents —O—, —S—, —SO₂—, or a divalent or higher organic group. In the above general formula, $R_{10}$—(O—)$_p$ and

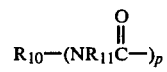

are examples of the organic group represented by Z. In these formulae, $R_{10}$ is a $C_{1-10}$ aliphatic, $C_{6-12}$ aromatic or $C_{5-12}$ alicyclic group having a valence of p; $R_{11}$ is a hydrogen atom or an alkylene group with 1 to 10 carbon atoms; and p is an integer of at least 2, for example 2 to 6.

When c equal O in the above formula, the compound is expressed by $R_6$-(-Z'-$R_7$)$_a$, and when c is 1, the compound is expressed by $[R_6$-(-Z'-$R_7$)$_a]_bZ$.

Examples of the aromatic group represented by $R_6$ or $R_7$ are a group composed of a benzene ring, a group composed of a naphthalene ring, and a group composed of a benzene or naphthalene ring which is substituted with a group selected from the class consisting of alkyl with 1 to 10 carbon atoms, cycloalkyl with 5 to 10 carbon atoms, aryl with 6 to 12 carbon atoms, nitro, alkoxy with 1 to 10 carbon atoms and aryloxy with 6 to 12 carbon atoms. The group composed of a benzene ring is especially preferred.

Examples of the aliphatic group are alkyl groups with 1 to 10 carbon atoms and alkylene groups with 1 to 10 carbon atoms.

Specific examples of the photo-reaction initiators of the above general formula are benzophenone, 4-methyl benzophenone, 4-nitrobenzophenone, 3-methylbenzophenone, 4,4'-dimethylbenzophenone, 3,3'-dimethylbenzophenone, 3,4'-dimethylbenzophenone, 4-phenylbenzophenone, 3-phenylbenzophenone, 3,3'-dinitrobenzophenone, 4,4'-dinitrobenzophenone, 3-nitrobenzophenone, 4-methoxybenzophenone, 3-methoxybenzophenone, 4,4'-dimethoxybenzophenone, 3,3'-dimethoxybenzophenone, bis(4-diphenyl)ketone, bis(3-diphenyl)ketone, 3,4-dimethylbenzophenone, 3,4,3',4'-tetramethylbenzophenone, Michler's ketone, anthraquinone, nitroanthraquinone, phenanthraquinone, acetophenone, propiophenone, benzil, benzoin, benzoin methyl ether, benzoin ethyl ether, benzoin propyl ether, benzoin butyl ether, benzoin phenyl ether, α-methylbenzoin methyl ether, α-phenylbenzoin ethyl ether, α-benzilbenzoin ethyl ether, benzil dimethyl ketal, benzil diethyl ketal, benzil dipropyl ketal, naphthyl phenyl ketone, bisnaphthyl ketone, ethylenebis(benzoylbenzamide), tetramethylenebis(benzoylbenzamide), hexamethylenebis (benzoylbenzamide), decamethylenebis(-benzoylbenzamide), dodecamethylenebis(benzoylbenzamide), hexamethylenebis(4-acetylbenzamide), hexamethylenebis[(4-methylbenzoyl) benzamide], ethylenebis[(4-nitrobenzoyl) benzamide], dodecamethylenebis[(4-methoxybenzoyl) benzamide], dibenzoyl benzene, bis(4-methylbenzoyl) benzene, ethylenebis(-benzoylphenyl ether), bis(benzoylmethyl) ether, tris(-benzoylphenoxy) benzene, and bis(4-methoxybenzoyl-methyl) ether.

The photo-reactive compounds disclosed in German OLS Nos. 1,769,168, 1,769,853, 1,807,297, 1,807,301, 1,919,678, and 1,949,010 can also be used in this invention.

The amounts of the aforesaid additives can be selected as desired. For example, the amounts per 100 parts by weight of the polyester (A) may not be more than about 10 parts by weight, preferably about 0.05 to about 5 parts by weight, for the ultraviolet absorbers; not more than about 10 parts by weight, preferably about 0.05 to about 5 parts by weight, for the oxidation or heat stabilizers; not more than about 10 parts by weight, preferably about 0.01 to about 5 parts by weight for the coloring agents; not more than about 10 parts by weight, preferably about 0.01 to about 5 parts by weight, for the optical brighteners; 0.01 to 20 parts by weight, preferably 0.05 to 15 parts by weight, more preferably 0.1 to 10 parts by weight, especially preferably 0.5 to 5 parts by weight, for the photo-reaction initiators; not more than 30 parts by weight, preferably 1 to 20 parts by weight, for the fire retardants; and not more than about 50 parts by weight, preferably about 0.1 to about 30 parts by weight, for the nucleating agents, lubricants or fillers.

The uncured composition of this invention may be formed into various shaped articles by conventional means. The shaped articles may, for examples, be films, sheets, filaments, fibers, yarns, and other articles of various shapes. Shaping of the composition can be performed by various known means such as melt spinning, melt film formation, melt injection molding, melt extrusion molding, and melt transfer molding. The shaping can be performed at a temperature above the melting point of the polyester (A), preferably from the melting point of the polyester to a point at which the polyester does not decompose, preferably to a point about 60° C. higher than the melting point. In the present invention, the above composition is preferably in the form of films or filaments, especially stretched films or filaments. More preferably, the composition is in the form of stretched and after-heat-treated films or filaments which have further been subjected to a curing treatment.

The curing treatment of the uncured composition of this invention in the form of films or filaments can be performed at any desired stage during the heating and/or heat-treatment of the composition, or in a subsequent stage. Preferably, the curing treatment is performed after the films or filaments have been oriented by stretching. In the case of filaments, the stretching can be carried out at a stretch ratio of 3 to 10 at a temperature from the second order transition point (Tg) of the polyester (A) to its melting point (Tm). Films may be stretched, for example, to 3 to 16 times their original area under the same temperature conditions.

The curing treatment may be performed, for example, by the following procedures.

(1) Heat-treatment of the composition in air at a high temperature of, say, about 150° C. to the Tm of the polyester, for a period of, say, at least 5 minutes.

(2) Application of ultraviolet irradiation to the composition at a temperature of from room temperature to the Tm of the polyester, preferably from Tg to (Tm−10) of the polyester, more preferably from (Tg+10) to (Tm−20) of the polyester, preferably in the presence of a photo-reaction initiator of the types described hereinabove.

(3) Impregnation of a radical generator such as a peroxide in the composition and subsequent heat-treatment of the composition at a temperature at which the radical generator decomposes.

(4) Application of electron beams to the composition in a dose of 0.01 Mrad to 100 Mrads at a temperature of from room temperature to Tm, preferably from Tg to (Tm−10), more preferably from (Tg+10) to (Tm−20).

The above procedures (1) to (4) may be used in combinations.

It has been confirmed that the composition becomes insoluble in solvents and the intrinsic viscosity of the polyester increases as a result of the curing treatment. This is presumably because a crosslinkage ascribable to the double bond of the allyl group in the polyallyl compound (B) is formed in the matrix of the saturated aromatic linear polyester (A), or a reaction takes place between (A) and (B).

Thus, sufficient curing treatment renders the cured composition insoluble in a solvent such as orthochlorophenol, and its chemical resistance becomes very superior. Even when the degree of curing is lower, the intrinsic viscosity of the polyester increases, and its thermal stability, dimensional stability, mechanical properties, etc. are improved.

In the curing procedure (3) described above, the impregnation of the shaped article with the radical generator can be performed by dipping it in a bath containing the radical generator in combination of, for example, a carrier or a dispersant known in the dyeing of polyester fibers, or by spraying such a solution onto the shaped article. The radical generator is selected under the condition that it does not substantially react at a temperature at which it is impregnated in the polyester.

Examples of the radical generator are t-butyl perbenzoate, methyl ethyl ketone peroxide, dicumyl peroxide, 2,5-dimethyl-2,5-di(t-butyl peroxide)hexane, t-butyl cumyl peroxide, t-butyl hydroperoxide, 2,5-dimethyl-2,5-di(t-butylperoxy)hexyne-3, di-b-butyl peroxide, diisopropylbenzene hydroperoxide, p-methane hydroperoxide, cumene peroxide, t-butyl peracetate, and t-butyl peroxyoctoate.

The present invention can, with commercial advantage, afford a cured polyester composition in the form of a desired shape article which has improved properties such as superior chemical resistance, thermal stability, light stability, dimensional stability and mechanical properties, and an uncured polyester composition which can be converted to the cured composition.

The curing procedure (2) is especially preferred since it is simple and can be performed within relatively short periods of time.

The following examples illustrate the present invention more specifically. In these examples, all parts are by weight. The intrinsic viscosities are values measured in o-chlorophenol at 35° C. The tenacity, elongation and Young's modulus of the shaped articles were measured at a pulling speed of 20 mm/min. using a tensile tester (Model TM-M) (a product of Instron Engineering Company).

EXAMPLES 1 TO 9 AND COMPARATIVE EXAMPLE 1

One hundred parts of polyethylene terephthalate pellets (intrinsic viscosity 0.69) and each of the polyallyl compounds shown in Table 1 in the amounts indicated were well mixed by an S-type blender. The mixture was extruded through an extruder at 280° C. The extrudate was pulverized to a size of 10 to 20 mesh. The resulting composition was allowed to stand for a week in a hot air Geer's aging tester at 210° C., and the decrease of the intrinsic viscosity of the polyethylene terephthalate, as a measure for the decrease of its degree of polymerization, was examined. The results are shown in Table 1.

For comparison, only the polyethylene terephalate pellets used above were processed and tested in the same way. The result is also shown in Table 1.

TABLE 1

| Example | Polyallyl compounds and their amounts (parts per 100 parts of the polyester) | | Intrinsic viscosity before testing | Intrinsic viscosity after testing |
|---|---|---|---|---|
| 1 | Triallyl isocyanurate | (3) | 0.67 | 0.57 |
| 2 | Diallyl stearyl cyanurate | (7) | 0.66 | 0.65 |
| 3 | N,N'-diallyltrimellit-amideimide | (5) | 0.66 | * |
| 4 | N,N'-dimethallyl benzamide | (5) | 0.67 | 0.58 |
| 5 | N,N'-benzophenone-3,4,3',4'-tetracarboxybisimide | (3) | 0.64 | * |
| 6 | Tricrotyl isocyanurate | (5) | 0.64 | 0.64 |
| 7 | Triallyl cyanurate | (4) | 0.66 | * |
| 8 | N,N'-diallyl sebacamide | (4) | 0.67 | 0.74 |
| 9 | Hexamethylenebis (N-allyl trimellitimide) amide | (6) | 0.65 | * |
| 1 (Comparative Example) | Not added | | 0.69 | 0.27 |

*: Insoluble in the solvent used for measuring the Intrinsic viscosity, after treatment at 140° C. for 1 hour.

EXAMPLE 10

A reactor equipped with a rectifying column was charged with 17.5 parts of dimethyl terephthalate, 1.9 parts of dimethyl isophthalate, 13.0 parts of ethylene glycol, 0.018 part of calcium acetate and 0.009 part of antimony trioxide, and they were reacted at an elevated temperature. After methanol distilled out in an amount nearly equal to the theoretical amount, the reaction mixture was transferred to a reactor equipped with a stirrer, and 0.015 part of trimethyl phosphate was added. The reaction was performed at 280° C. under atmospheric pressure for 30 minutes. Then, the reaction system was gradually reduced in pressure to about 0.5 mmHg (absolute) over the course of 30 minutes, and the reaction was performed for an additional 30 minutes. Then, 1.0 part of N,N'-diallyl pyromellitimide was added, and the reaction was performed for 40 minutes under a pressure of 0.5 mmHg (absolute). The resulting polyester composition had an intrinsic viscosity of 0.63. The polyester composition was then pulverized to a size of 10 to 20 mesh, and allowed to stand in the air at 210° C. Three days later, it became completely insoluble in tetrachloroethane.

For comparison, the above procedure was repeated without adding N,N'-diallyl pyromellitimide. A polyester having an intrinsic viscosity of 0.64 was obtained. When the polyester was allowed to stand for 3 days in the air at 210° C., it was very easily soluble in tetrachloroethane, and its intrinsic viscosity decreased to 0.3.

EXAMPLES 11 TO 20 AND COMPARATIVE EXAMPLE 2

One hundred parts of polyethylene terephthalate pellets (intrinsic viscosity 0.69) and each of the polyallyl compounds indicated in Table 2 in the amounts indicated were well mixed by an S-type blender. The mixture was extruded by an extruder at 280° C. The resulting pellets were pulverized to a size of 10 to 20 mesh. The resulting composition was allowed to stand for 1 to 3 days in a hot air Geer's aging tester at 210° C., and the decrease of the intrinsic viscosity of the polyethylene terephthalate, as a measure for the decrease of its degree of polymerization, was examined, and the results are shown in Table 2.

For comparison, only the polyethylene terephthalate pellets were processed and tested in the same way as above. The result is also shown in Table 2.

TABLE 2

| Example | Polyallyl compounds and their amounts (parts per 100 parts of the polyester) | | Intrinsic viscosity | | |
|---|---|---|---|---|---|
| | | | Before treatment | After treatment at 210° C. for one day | After treatment at 210° C. for 3 days |
| 11 | N,N,N',N'-tetraallyl isophthalamide | (4) | 0.63 | 1.08 | * |
| 12 | N,N,N',N'-tetraallyl terephthalamide | (4) | 0.63 | 0.93 | * |
| 13 | N,N,N',N',N'',N''-hexaallyl trimesamide | (3) | 0.64 | * | — |
| 14 | N,N,N',N',N'',N''-hexaallyl trimesamide | (5) | 0.66 | ** | — |
| 15 | N,N,N',N',N'',N''-hexaallyl trimellitamide | (3) | 0.63 | * | — |
| 16 | N,N'-diallyl decamethylene carboxyamide | (5) | 0.65 | 0.71 | 0.78 |
| 17 | N,N',N''-triallyl trimesamide | (4) | 0.65 | * | — |
| 18 | N,N,N'-triallyl trimellitamideimide | (5) | 0.66 | * | — |
| 19 | Hexamethylenebis(diallyl isocyanurate) | (4) | 0.65 | * | — |
| 20 | Diallyl lauryl isocyanurate | (5) | 0.63 | 0.70 | 0.75 |
| 2 (Comparative | Not added | | 0.69 | 0.45 | 0.33 |

TABLE 2-continued

| | | Intrinsic viscosity | | |
| --- | --- | --- | --- | --- |
| Example | Polyallyl compounds and their amounts (parts per 100 parts of the polyester) | Before treatment | After treatment at 210° C. for one day | After treatment at 210° C. for 3 days |
| Example | | | | |

*: Did not dissolve in the solvent after treatment at 140° C. for 1 hour.
**: After treatment at 210° C. for 2 hours, the intrinsic viscosity of the polyester was 0.87; after treatment at 210° C. for 4 hours, the intrinsic viscosity was 1.22; and after treatment at 210° C. for 6 hours, and at 140° C. for 1 hour, the polymer did not dissolve in the solvent.

The above results show that the compositions of this invention have superior thermal stability.

The polyallyl compound added in Example 19 was prepared as follows:

Hexamethylene dibromide (12.2 parts) was dropped at 50° C. to 23.1 parts of sodium diallyl isocyanurate and 100 parts of dimethyl formamide, and the reaction was performed at 60° C. for 30 minutes, followed by cooling to afford crystals.

The crystals had a melting point of 117° C. By an infrared absorption spectrum, the absorption of allyl at 930, 990 and 1640 cm$^{-1}$ was confirmed. The result of elemental analysis coincided with hexamethylenebis(diallyl isocyanurate).

EXAMPLES 21 TO 23 AND COMPARATIVE EXAMPLE 3

One hundred parts of polyethylene terephthalate pellets (intrinsic viscosity 0.69) was blended with each of the polyallyl compounds shown in Tabel 3 below in the amounts indicated. The mixture was extruded, and pulverized to a size of 10 to 20 in the same way as in Examples 1 to 9. The composition obtained was exposed to a 100 W high pressure mercury lamp at 160° C. for 30 minutes. The results are shown in Table 3.

TABLE 3

| | | | Intrinsic viscosity | |
| --- | --- | --- | --- | --- |
| Example | Polyallyl compounds and their amounts (parts per 100 parts of the polyester) | | Before irradiation | After irradiation |
| 21 | Triallyl isocyanurate | (4) | 0.67 | 0.70 |
| 22 | Polycarbonate of 3,3'-diallyl bisphenol A (degree of polymerization about 6) | (5) | 0.63 | 0.67 |
| 23 | N,N'-diallyl terephthalamide | (5) | 0.65 | 0.67 |
| 3 (Comparative Example) | Not added | | 0.69 | 0.64 |

It is seen that the compositions of this invention had increased intrinsic viscosities after application of ultraviolet irradiations and thus had superior light stability.

The polyallyl compound used in Example 22 was synthesized as follows:

Allyl chloride (230 parts) was added to a solution consisting of 228 parts of bisphenol A, 84 parts of sodium hydroxide, 700 parts of water and 800 parts of ethanol, and they were reacted under refluxing of the ethanol for 5 hours. The oil layer was stirred in a steam of nitrogen at 250° C. for 15 minutes, and distilled at 223° C. and 2.5 mmHg to afford 222 parts of 3,3'-diallyl bisphenol A.

Then, 30.8 parts of 3,3'-diallyl bisphenol A, 23.5 parts of diphenyl carbonate and 0.01 part of titanium tetrabutoxide were reacted in a stream of nitrogen at 240° C. for 10 minutes, and then at reduced pressure for 30 minutes to afford a polymer. The polymer had a degree of polymerization of about 6. Its infrared absorption spectrum showed the absorption of allyl (910 cm$^{-1}$, 990 cm$^{-1}$, 1640 cm$^{-1}$), and the absorption of carbonate (1755 cm$^{-1}$).

EXAMPLE 24

The composition obtained in Example 14 was dried, melted at 280° C., and extruded through a T die to obtain a film having a thickness of about 500 microns. The film was simultaneously stretched biaxially at a stretch ratio of 3.5 each in the longitudinal and transverse directions at about 85° C., and then heat-treated at constant length for 2 minutes at 220° C. The film had a tenacity of 20.3 kg/mm$^2$ and an elongation of 122%. The film was allowed to stand in a Geer's aging tester at 180° C. to perform a heat deterioration test. After the test, the film had a tenacity of 12.3 kg/mm$^2$ (retention 61%) and an elongation of 98% (retention 80%), and was quite insoluble in a solvent for use in measuring the viscosity of the polymer.

For comparison, a biaxilly oriented film was obtained from the polymer of Comparative Example 2 in the same way as above, and subjected to the same heat deterioration test. Before the test, the film had a tenacity of 21.2 kg/mm$^2$ and an elongation of 119%. After the test, it had a tenacity of 9.0 kg/mm$^2$ (retention 42%) and an elongation of 8% (retention 7%). This shows greater deterioration than the composition of this invention.

When the heat deterioration test was performed at 230° C. for 3 hours, the composition in the comparison became brittle and could not be bended, whereas the composition of this invention retained flexibility.

EXAMPLE 25 AND COMPARATIVE EXAMPLE 4

One hundred parts of polyethylene terephthalate pellets (intrinsic viscosity 0.67) was mixed with 4 parts of triallyl isocyanurate in the same way as in Examples 1 to 9. The mixture was melted at 280° C., and extruded from an orifice having a diameter of 0.5 mm at 275° C. to form an unstretched filament. The unstretched filament was stretched to 5.1 times at 80° C. Furthermore, the filament was heat-treated while it was stretched to 1.05 times. The stretched filaments had a tenacity of 5.9 g/de and an elongation of 19.3%.

In order to examine the thermal stability of the filament, it was allowed to stand for 350 hours in a Geer's aging tester at 190° C. It had a tenacity of 3.4 g/de (retention 58%) and an elongation of 12.6% (retention 65%) after the heat deterioration test.

For comparison, a filament having a tenacity of 6.2 g/de and an elongation of 20.1% was prepared in the

EXAMPLE 33 AND COMPARATIVE EXAMPLE 7

The stretched filament obtained in Example 32 (before the curing treatment) was treated in air at 220° C. for about 30 seconds while maintaining them at 3% stretch. The resulting filament became partly insoluble in o-chlorophenol. The insoluble matter was removed by filtration, and the intrinsic viscosity of the filament measured was 0.76. The filament had a tenacity of 5.8 g/de and a Young's modulus of 137 g/de.

In order to examine the thermal stability of the filaments, the filament was allowed to stand in a Geer's aging tester at 210° C. After a lapse of 200 hours, the retention of its elongation was more than 50%.

For comparison, the cured and stretched fialment obtained in Comparative Example 6 was subjected to the same test. After a lapse of 100 hours, the tenacity retention became less than 50%.

thallyl pyromellitimide to provide a strength of 30 kg/mm$^2$, an elongation of 98% and a Young's modulus of 397 kg/mm$^2$. It was found that in about 50 hours, its elongation retention became less than 50%.

EXAMPLES 35 TO 42 AND COMPARATIVE EXAMPLE 8

One hundred parts of polyethylene terephthalate pellets (intrinsic viscosity 0.66) was blended with each of the polyallyl compounds shown in Table 6 and each of the compounds (c) shown in Table 6 in the amounts indicated by using an S-type blender. The mixture was extruded through an extruder at 275° C., and pulverized to a size of 10 to 20 mesh. The composition obtained was placed on a hot plate held at each of the temperatures indicated in Table 6, and exposed to the irradiation of a 100 W high-pressure mercury lamp for each of the times indicated in Table 6. The results are shown in Table 6.

TABLE 6

| Example | Polyallyl compounds and their amounts (parts per 100 parts of the polyester) | | Compounds (c) and their amounts (parts per 100 parts of the polyester) | | UV irradiating conditions — Temperature of the hot plate (°C.) | UV irradiating conditions — Irradiating time (minutes) | Intrinsic viscosity — Before irradiation | Intrinsic viscosity — After irradiation |
|---|---|---|---|---|---|---|---|---|
| 35 | Triallyl isocyanurate | (3) | Benzophenone | (1) | 150 | 15 | 0.62 | * |
| 36 | Triallyl isocyanurate | (5) | Benzophenone | (2) | 120 | 5 | 0.62 | 0.69* |
| 37 | Triallyl isocyanurate | (3) | Hexamethylenebis (benzoylbenzamide) | (2) | 140 | 10 | 0.61 | * |
| 38 | Triallyl cyanurate | (2) | Benzil | (2) | 140 | 5 | 0.63 | 0.73** |
| 39 | Hexaallyl trimesamide | (4) | Benzoin ethyl ether | (1) | 120 | 5 | 0.61 | 0.68** |
| 40 | N,N'-dicrotyl- pyromellitimide | (5) | Benzil dimethyl ketal | (2) | 140 | 10 | 0.63 | * |
| 41 | N,N,N',N'-tetra- methallyl tere- phthalamide | (3) | Dodecamethylenebis (benzoylbenzamide) | (2) | 150 | 5 | 0.63 | 0.72** |
| 42 | Tricrotyl cyanurate | (7) | Ethylenebis- benzoylphenyl) ether | (2) | 160 | 15 | 0.62 | * |
| 8 (Comparative Example) | Not added | | Not added | | 150 | 15 | 0.66 | 0.64 |

*: Insoluble in the solvent used for measurement
**: Partly insoluble in the solvent used for measurement, and the measurement was made after removing the insoluble matter by filtration.

EXAMPLE 34

One hundred parts of polyethylene terephthalate having an intrinsic viscosity of 0.65 was blended with 5 parts of N,N'-dimethallyl pyromellitimide. The blend was melted at 275° C., and extruded through a T die having a slit width of 600μ and a width of 10 cm, and then cooled. The sheet obtained was biaxially stretched simultaneously at a stretch ratio of 3.6 at 80° C., and then heat-treated at 200° C. for 1 minute at constant length. The resulting film had a thickness of about 37μ, a break strength of 22 kg/mm$^2$, an elongation of 113%, a Young's modulus of 381 kg/mm$^2$, and an intrinsic viscosity of 0.63. Electron beams in a dose of 10 Mrads were applied to the film under tension. The film so treated was partly insoluble in o-chlorophenol, and the film had a strength of 34 kg/mm$^2$, an elongation of 83% and a Young's modulus of 477 kg/mm$^2$.

The film was subjected to a heat deterioration test by a Geer's aging tester at 190° C. After a lapse of 200 hours, the elongation retention was more than 50%. In contrast, when electron beams were applied to a film of polyethylene terephthalate not containing N,N'-dime-

EXAMPLE 43 AND COMPARATIVE EXAMPLE 9

One hundred parts of polyethylene terephthalate pellets (intrinsic viscosity 0.65), 5 parts of N,N',N''-triallyl trimesamide and 2 parts of 4-methylbenzophenone were mixed and pulverized in the same way as in Example 1 to obtain a composition having a particle size of 10 to 20 mesh. The composition had an intrinsic viscosity of 0.63. When the composition was allowed to stand for 20 hours in a hot air dryer at 210° C., it was crosslinked and became insoluble in o-chlorophenol. When it was exposed to the irradiation of a 100 W mercury lamp on a hot plate held at 150° C., the intrinsic viscosity of the composition increased to 0.71 in 5 minutes, and after a lapse of 15 minutes, the composition became completely insoluble in o-chlorophenol.

For comparison, the polyethylene terephthalate pellets alone without the additives were processed in the same way as above and exposed to the irradiation of a mercury lamp on a hot plate held at 150° C., the intrinsic viscosity of the composition decreased to 0.63 in 15 minutes.

EXAMPLE 44 AND COMPARATIVE EXAMPLE 10

The composition obtained in Example 35 (prior to UV irradiation) was pulverized, dried, and melt-extruded through an orifice with a diameter of 0.5 mm at 275° C. to afford an unstretched filament. The unstretched filament was then stretched to 5.1 times at 80° C., and then heat-treated at 220° C. while being stretched to 1.05 times. The stretched filament was exposed to the irradiation of a 1.5 KW high-pressure mercury lamp at 160° C. for 30 seconds at constant length. The filament became partly insoluble in the solvent used to measure the intrinsic viscosity, and had a tenacity of 5.2 g/de and an elongation of 18.3%.

To examine the heat stability of the filament, the filament was allowed to stand for 350 hours in a Geer's aging tester at 190° C. The filament had a tenacity of 3.5 g/de (retention 67%), and an elongation of 12.6% (retention 69%).

For comparison, polyethylene terephthalate pellets (intrinsic viscosity 0.66) were spun, stretched and heat-treated in the same way as above to afford a stretched filament having a tenacity of 6.1 g/de and an elongation of 20.1%. After the same heat deterioration test as described above, the filament had a tenacity of 3.0 g/de (retention 49%) and an elongation of 9.0% (retention 45%).

It is seen therefore that the filament of the invention is superior in heat stability to that of the comparison.

EXAMPLE 45 AND COMPARATIVE EXAMPLE 11

One hundred parts of polyethylene terephthalate pellets (intrinsic viscosity 0.69), 1.5 parts of triallyl cyanurate and 0.5 part of benzophenone were mixed in the same way as in Examples 1 to 9. The mixture was extruded at 275° C. from a T die to form a film having a thickness of about 500μ. Then, at 85° C., the film was stretched biaxially to 3.75 times simultaneously in the longitudinal and transverse directions, and then heat-treated at 235° C. for 2 minutes at constant length. Then, the film was exposed to the irradiation of a 1.5 KW high pressure mercury lamp at 180° C. for 30 seconds at constant length. The resulting film was insoluble in the solvent used to measure the intrinsic viscosity, and had a tenacity of 19.0 kg/mm² and an elongation of 92%. The film had a thickness of about 35 microns. To examine its light stability, the film was exposed to the irradiation of a xenon lamp for 4 days. The film then had a strength of 18.2 kg/mm² (retention 96%) and an elongation of 85% (retention 92%).

For comparison, the polyethylene terephthalate pellets alone without the additives were formed into a film, stretched, and heat-treated in the same way as described above to afford a film having a strength of 20.4 kg/mm², an elongation of 105% and a thickness of about 36 microns. When it was exposed to a xenon lamp under the same conditions as above, the film then had a strength of 16.0 kg/mm² (retention 78%) and an elongation of 89% (retention 85%).

It can therefore be seen that the film in accordance with this invention had superior light stability.

What we claim is:

1. A process for preparing a cured linear aromatic polyester composition, which comprises extruding under melting conditions, an uncured linear aromatic polyester composition comprising (A) 100 parts by weight of a saturated linear aromatic polyester in which at least 70 mole % of the acid component consists of terephthalic acid and the glycol component is ethylene glycol, and (B) 0.1 to 50 parts by weight of a polyallyl compound which contains not less than 2 allyl or substituted allyl groups in the molecule, does not decompose under conditions of melt-blending with the polyester (A), and is non-reactive with the polyester (A) under conditions of melt-blending with the polyester (A), the allyl or substituted allyl groups being expressed by the following formula

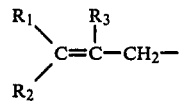

wherein $R_1$, $R_2$ and $R_3$ are identical to or different from each other and represent a member selected from the group consisting of a hydrogen atoms and organic groups;

and subjecting the resulting extrudate to a curing treatment by the application of ultraviolet irradiation in the presence of a photo-reaction initiator.

2. The process of claim 1 wherein the organic groups represented by $R_1$, $R_2$ and $R_3$ are alkyl groups containing 1 to 6 carbon atoms, a phenyl group, or substituted phenyl groups in which the substituent is selected from halogen atoms and lower alkyl groups.

3. The process of claim 1 wherein the polyallyl compound (B) is selected from the group consisting of (I) compounds of the general formula

wherein A represents an allyl group or a substituted allyl group shown in formula (1); X is a member selected from the group consisting of —CONR$_4$—* in which R$_4$ represents a hydrogen atom or an alkyl group containing 1 to 4 carbon atoms,

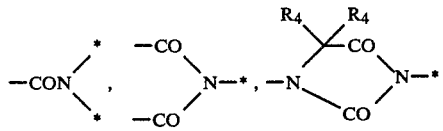

in which R$_4$ is as defined above and the two R$_4$ groups may be the same or different, and —O—*, the symbol * in the above formulae showing that A is bonded; Q$_1$ represents a group selected from the class consisting of monovalent to tetravalent aliphatic groups containing 2 to 20 carbon atoms, monovalent to tetravalent alicyclic groups containing 4 to 12 alicyclic groups, monovalent to tetravalent groups of the formula

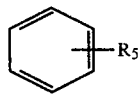

in which R$_5$ represents a hydrogen atom, an aryl group containing 1 to 6 carbon atoms, an alkyloxy group containing 1 to 6 carbon atoms, a nitro group or a halogen atom, monovalent to tetravalent groups of the formula

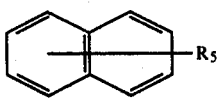

in which $R_5$ is as defined above, and monovalent to tetravalent groups of the formula

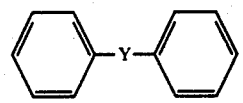

in which Y is a member selected from the class consisting of —O—, —CO—, —SO$_2$, —NR$_4$— in which R$_4$ is as defined above, —O(CH$_2$CH$_2$)$_l$O— in which l is an integer of 1 to 3, and alkylene groups containing 2 to 12 carbon atoms; when X is —O—*, Q$_1$ represents an aliphatic group or an alicyclic group; and m and n are each integers of 1 to 4 and m×n≧2;

(II) compounds of the general formula wherein A is Q''$_1$ are as defined above, Q'''$_1$ represents a group having a valence of 3 to (k+2) and expressed by

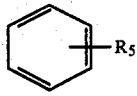

in which $R_5$ is as defined hereinabove, a group having a valence of 3 to (k+2) and expressed by

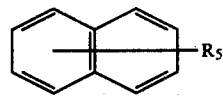

or a group having a valence of 3 to (k+2) and expressed by

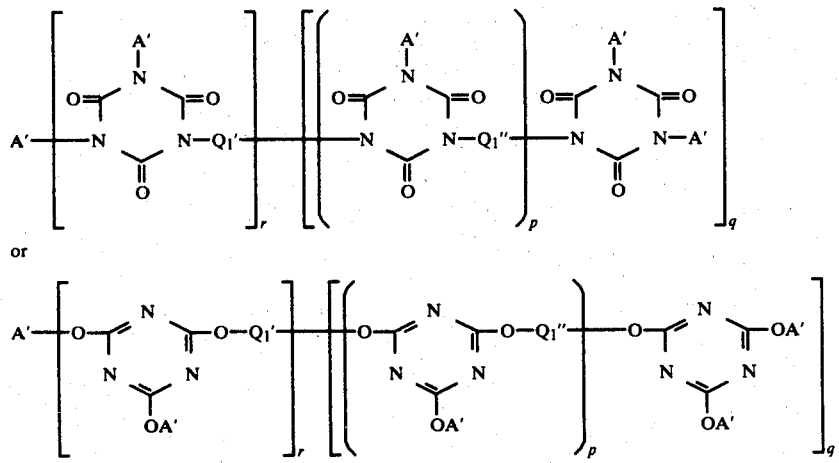

or wherein two or more A' groups may be the same or different, and at least two of them are groups A as defined above, and the rest are groups A or monovalent groups represented by Q$_1$ in formula (I); Q'$_1$ are divalent to tetravalent groups of Q$_1$ in formula (I); Q''$_1$ represents divalent groups of Q$_1$ in formula (I); r is 0 or 1; p is 0 or an integer of up to 10; and q is an integer of 1 to 3; and (III) compounds of the general formula

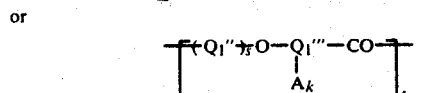

or

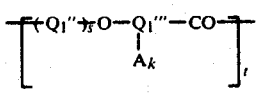

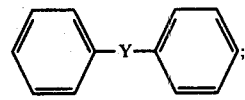

k is an integer of 1 to 4; s is 0 or 1; and t is an integer greater than 1, and k×t≧2.

4. The process of claim 1 wherein the linear aromatic polyester (A) has an intrinsic viscosity, as measured in o-chlorophenol at 35° C., of at least 0.4.

5. The process of claim 3 wherein the polyallyl compound (B) is selected from the group consisting of the compounds of the group (II).

6. The process of claim 1 wherein R$_1$, R$_2$ and R$_3$ are each a hydrogen atom.

7. The process of claim 1 wherein the polyallyl compound is a member selected fron the group consisting of compounds of the following formula:

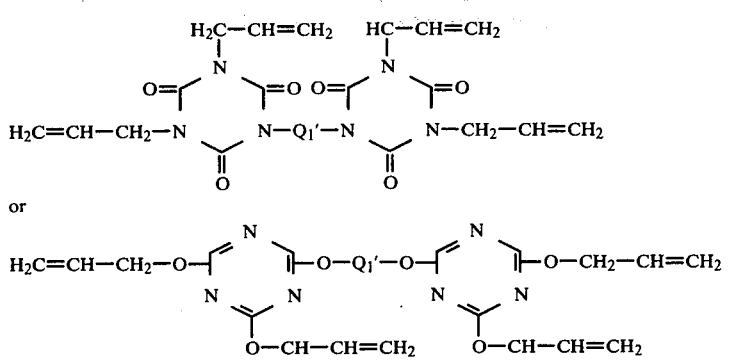
(II)

wherein $Q'_1$ is a divalent aliphatic group.

8. The process of claim 1 wherein the allyl or substituted allyl group expressed by the formula is allyl, methallyl or crotyl.

9. The process of claim 5 wherein the polyallyl compound (B) is a member selected from the group consisting of triallyl isocyanurate,
diallyl methyl isocyanurate,
diallyl ethyl isocyanurate,
diallyl decyl isocyanurate
diallyl dodecyl isocyanurate
diallyl stearyl isocyanurate,
diallyl lauryl isocyanurate,
diallyl myristyl isocyanurate,
diallyl cetyl isocyanurate,
ethylenebis diallyl isocyanurate tetramethylenebis diallyl isocyanurate,
hexamethylenebis diallyl isocyanurate,
decamethylenebis diallyl isocyanurate,
polyethylene allyl isocyanurate terminated with a diallyl isocyanurate residue,
polytetramethylene allyl isocyanurate terminated with a diallyl isocyanurate residue,
polyhexamethylene allyl isocyanurate,
polydecamethylene allyl isocyanurate triallyl cyanurate,
diallyl methyl cyanurate,
diallyl ethyl cyanurate,
diallyl cecyl cyanurate,
diallyl dodecyl cyanurate,
diallyl stearyl cyanurate,
diallyl lauryl cyanurate,
diallyl myristyl cyanurate,
diallyl cetyl cyanurate,
tetramethylenebis diallyl cyanurate,
hexamethylenebis diallyl cyanurate,
decamethylenebis diallyl cyanurate,
polytetramethylene allyl cyanurate terminated with a diallyl cyanurate residue,
polyhexamethylene allyl cyanurate terminated with a diallyl cyanurate residue, and
polydecamethylene allyl cyanurate terminated with a diallyl cyanurate residue.

10. The process of claim 1 wherein the linear aromatic polyester composition comprises 1.0 to 20 parts by weight of the polyallyl compound (B) per 100 parts by weight of the saturated linear aromatic polyester (A).

11. A cured linear aromatic polyester composition obtained by the process of claim 1.

* * * * *